INVENTOR.
GIUSEPPE TUDISCO

*INVENTOR.*
GIUSEPPE TUDISCO

Aug. 4, 1970        G. TUDISCO        3,522,615
TURNOVER WALL-A-BED WITH COUNTERBALANCE WEIGHT AND
END-STROKE SHOCK ABSORBER BRAKE
Filed Feb. 2, 1967        4 Sheets-Sheet 3

INVENTOR.
GIUSEPPE TUDISCO

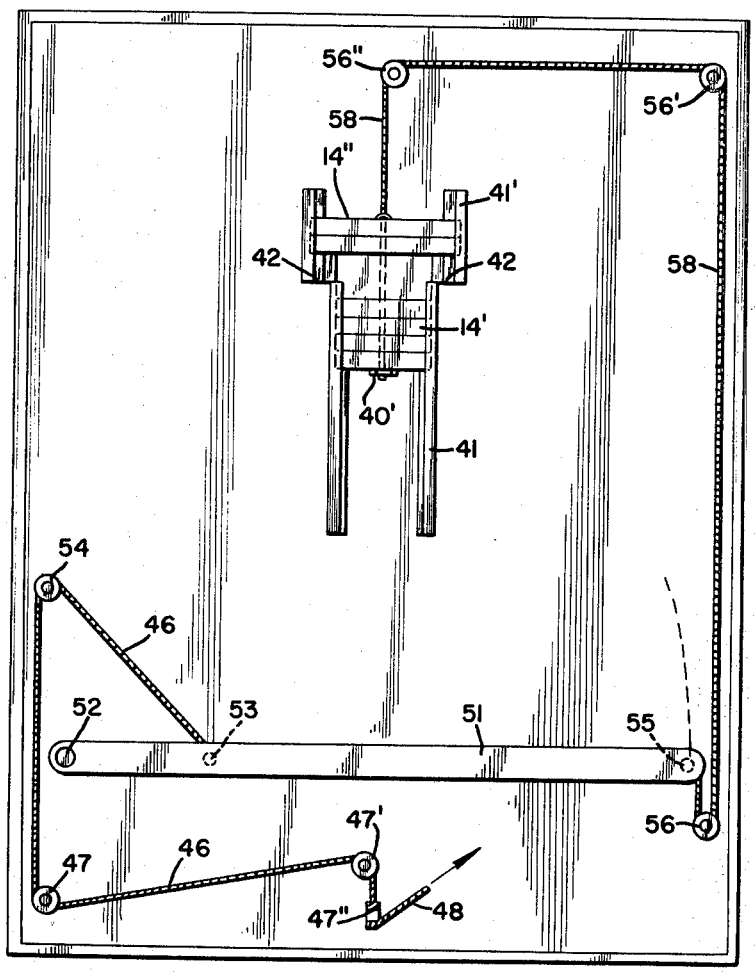

United States Patent Office 3,522,615
Patented Aug. 4, 1970

3,522,615
TURNOVER WALL-A-BED WITH COUNTER-BALANCE WEIGHT AND END-STROKE SHOCK ABSORBER BRAKE
Giuseppe Tudisco, Asmara, Rome 58, Italy
Filed Feb. 2, 1967, Ser. No. 623,791
Claims priority, application Italy, Feb. 11, 1966,
2,988/66; June 10, 1966, 12,893/66
Int. Cl. A47c 17/40
U.S. Cl. 5—10                                    6 Claims

ABSTRACT OF THE DISCLOSURE

This invention pertains to a turnover double or single wall-a-bed, which can be stored during its upright position in a container made up of a wooden wardrobe.

---

This invention pertains to a turnover-wall-a-bed that can be stored in a suitable wooden wardrobe, and sums up what is described in the application for the main patent filed in Italy on Feb. 11, 1966, No. 11 II 66/254 and in the first completive application, filed in Italy on June 10, 1966, No. 10 VI 66/35/4.

To be more specific, this invention pertains to a "turnover double or single wall-a-bed" which can be stored, during its upright rest position, or position of storage, in a container made up of a wooden wardrobe, and is subject to an angular movement around an axis parallel to that of the bed headboard panel and fitted to this, so that it can be shifted to the horizontal position or to the position of use by the aid of a specific system of counterbalances and shock absorbers. This system also performs its function in the angular movement of the wall-a-bed in the reverse direction, in other words, from the horizontal position of use to that of vertical position of storage.

This turnover wall-a-bed has already been subjected to practical experimentation for many years, particularly due to the fact that it tends to constitute a solution to contingent or continuous problems of space shortage in the rooms of an apartment. For example, in the case of a double bed, to which this invention particularly makes reference, the space occupied by it under usual conditions of use, can be estimated at not less than 3.50 square meters, so that, in many cases, the invention provides a remarkable solution to the problem when the room in which the bed is located has a relatively small area, which is a peculiarity often encountered in modern buildings. Upsetting, which in this case is limited to an angular displacement of the double or single bed of about 90 degrees from the storage position, or practically vertical to a normal position of use, is usually accomplished by a device applied by a rotation around both an axis parallel to the head-board and fitted to it, and around an axis almost corresponding to that of one of the sides of the bed. For all practical purposes, such a solution pertains almost exclusively to a single bed. In an attempt to apply the system to a double bed, it has been necessary to have recourse to mechanisms making more convenient and less heavy the operation for the displacement in either direction, as above specified. This is substantially due to the fact that the rotation around the axis, as provided, for reaching the final extreme conditions of use or storage starting from those of storage or use respectively, causes a variation in the projection on a horizontal plane of the arm between the center of gravity of the bed and the axis of rotation. These variations follow a sinusoidal law which is accompanied by a correspondent variation in the dynamics of the playing forces (weight of the bed) in respect to such an axis.

Starting from the storage position, the rotation around the axis provided would gradually effect a growing increase of the relative momentum according to the aforesaid sinusoidal movement, or, more specifically, in the direction of the movement, cosinusoidal; and this would require a notable, growing effort by the operator so as to avoid unwanted consequences, such as a reverse movement, to bring the bed into the storage position, which would require a rather special effort at first, related to the weight of the bed and to the arm of the center of gravity, even taking into consideration the greater leverage which may be expected to make use of the applied strength of the operator in such an operation. Particular attention to this initial effort must be paid during the angular displacement. The aforesaid attempts to minimize, if not eliminate entirely, the disadvantages of such conditions, actually have not brought satisfactory results from an economic standpoint in the past, for which reason explanations are very scarce as to the diffusion of the applicability of the turning-over principle which is usually linked with such a pattern of bed.

The main object of this invention is to reduce the effort in turning over the bed to the lowest possible level, making this operation more convenient, particularly in the case of a double bed, and offering much more security to the operator during the working phase. To this end, appropriate counterbalances are used whose momentum tends to oppose itself, in contrast with the fact that it ordinarily tends to approach itself to correspond to the variations of the momentum of the weight of the bed.

Another object of this invention is to absorb, as much as possible, the shocks consequent upon the action that the weight of the bed performs, particularly in the final portion of the movement toward the position of storage and the position of use, as well. Taking into account that, in the first place, the greatest leverage related to the momentum of the weight of the bed, can be attained rather quickly, and that, in the second place, for the sake of stability, one must tend to make it go beyond even in a slight degree the vertical to the straight line that leads to the center of gravity of the bed from the rotation axis.

Other objects and advantages of the invention are outlined in the following description, which refers to practical embodiments of the invention as examples, though not limiting the scope of the invention itself.

The following is a description of the invention as illustrated in the drawings attached hereto, in which.

Figure 8:
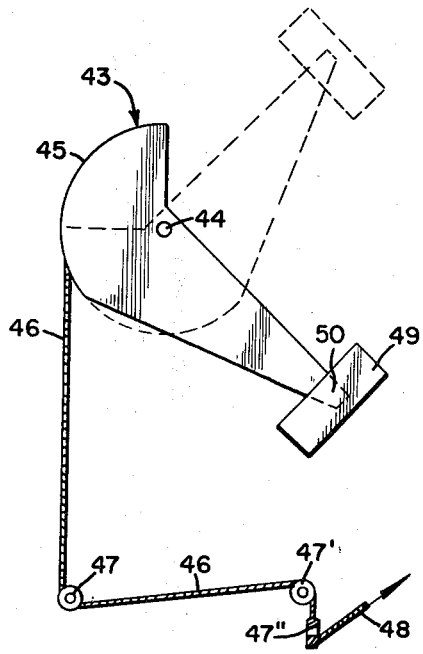

FIG. 8 is a schematic representation of a practical embodiment with another lever of the first variety, viewed from the front, in which the connection with the turn-over wall-a-bed corresponds with the central area of the headboard; and FIG. 9 shows a schematic representation of another practical embodiment with lever and counterbalance, in which the lever, viewed from the front, has its fulcrum at one extremity and the connection with the bed once more in corresponding position with the central area of the headboard.

Figure 1:
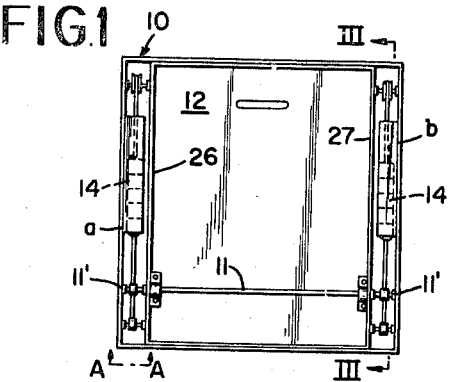
FIG. 1 is a schematic representation of the front of the bed, viewed from its storage position inside a wooden wardrobe with an open door according to a first practical embodiment of the counterbalance system and shock absorber brakes.

In FIG. 1 at 10 the wooden wardrobe inside it shown in the lower part of which is assembled a double bed in its condition of possible rotation around an axis parallel to its headboard. In its almost vertical position of storage, the bed is entirely settled inside the wardrobe. The rotation mast is shown at 11, which is fastened to bed 12 and assembled on appropriate supporters fixed to the wooden wardrobe, so that the bed 12 may reach its horizontal use position by the rotation of mast 11. The supporters on which the rotation mast 11 is assembled are preferably fixed to opposite sides of the wooden wardrobe at points A and B, respectively, and they can be made up of ball bearings or bushings 11, which allow the mast 11, and therefore the bed 12, to which it is fixed, a rotation of little more than 90 degrees, thus permitting the passage of the bed from the almost vertical storage position to the almost horizontal position of use, and vice versa.

In order to maintain the bed in the vertical position of storage, besides creating a momentum in opposition to that of the weight of the bed, in this first practical embodiment, a mechanism of counterbalance is envisioned. It is made up of a weight 14 preferably formed of several more elements which are movable in the vertical guides 15, and suspended at one extremity 16 of the string, a chain or similar device 17 that passes around a pulley 18 positioned in the upper part of the wooden wardrobe, passing on to another pulley 19 positioned in the lower part of the wooden wardrobe, and having its other extremity connected with the free extremity 21 of an arm 22 which is fixed by means of its other extremity to mast 11. The connection is such that in the storage position, the bed 12 is maintained in an almost vertical position by the action of counterbalance 14; whereas the bed 12 is maintained by its own weight in the position of use, which is horizontal, the bed 12 being maintained by its own weight with the aid of small legs (not shown) which act as a go-between from the base of the bed to the floor.

As already mentioned, the counterbalance 14 serves to decrease, to a certain extent, the effect of the momentum by which the weight tends to create an increase of speed of passage from the phase of vertical position to that of the horizontal position. To absorb shocks and to brake the movement of the bed from one position to the other, a hydraulic brake and/or a spring brake 23 is provided. This particular brake is attached to one of the sides. For practical purposes, it is proposed in the practical embodiment, to add another arm 24 which has the function of acting as a drive for the brake 23, and an articulation staff 20 which connects the free extremities of the arms 22 and 24.

FIG. 1 shows panels of delimitation 26 and 27 for the container of the bed 12 and illustrates how the various mechanisms for drive and movement can be shut up in two small hollows obtained respectively between the side a and the panel 26 and between b and the panel 27. It might be noted that for this practical embodiment the aforesaid small legs, which act as go-betweens from the base of the bed to the floor, can be pliably assembled in the bottom part of the bed itself so as to be actionable by hand when the bed is in position of use.

Figure 2:
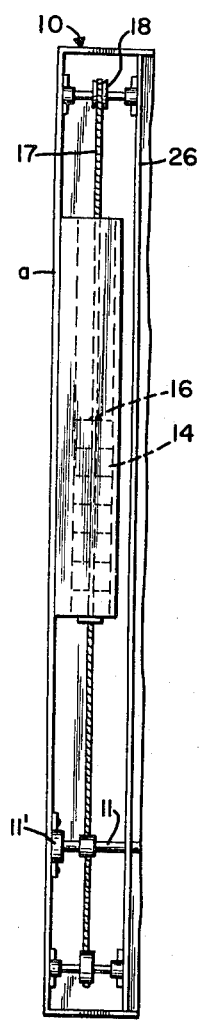
FIG. 2 is a schematic partial representation, viewed from the front, relative to part A—A of FIG. 1, but on a larger scale.
Figure 3:
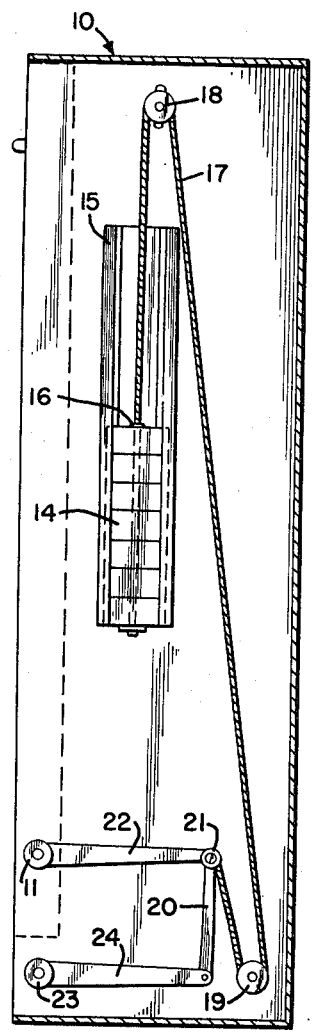
FIG. 3 is a schematic, vertical section on line III—III of FIGS. 1 and 2.
Figure 4:
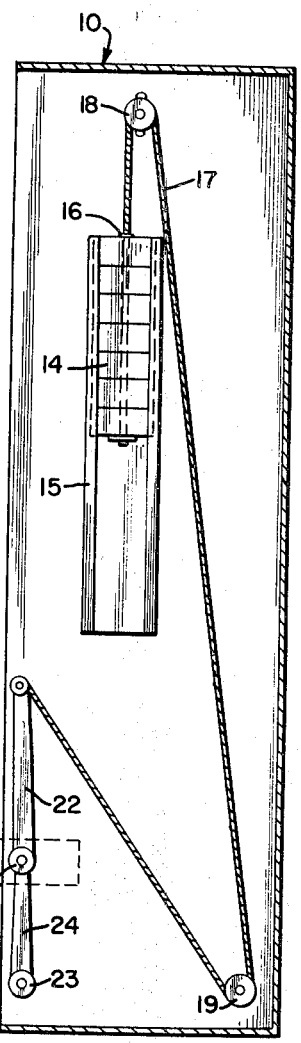
FIG. 4 is a section similar to that of FIG. 3, with the bed portrayed in actual position of use.
Figure 5:
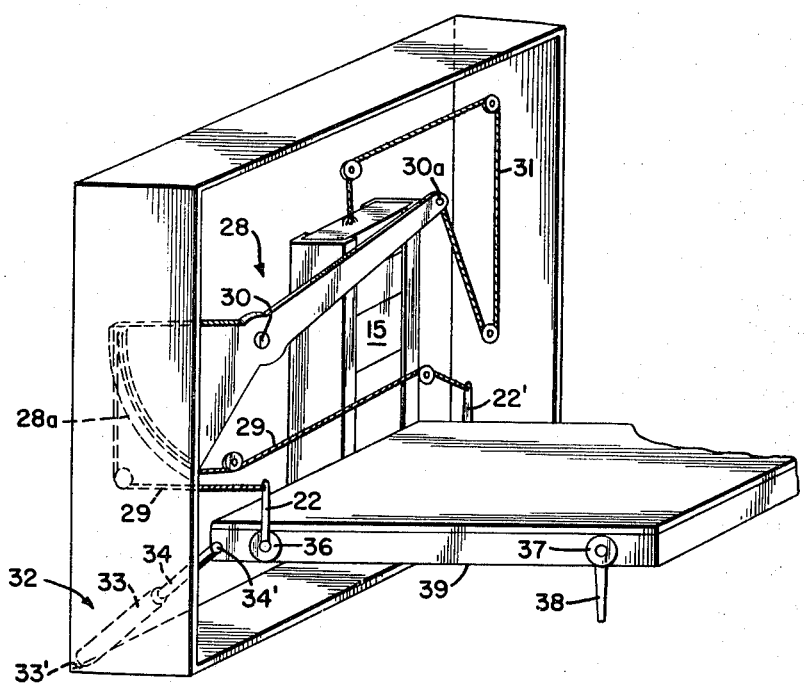
FIG. 5 is a schematic representation, in perspective, of another embodiment of the lever system, counterbalance and shock absorber brakes according to this invention, with the bed in its position of use.

One practical embodiment, in FIG. 5, aims at reducing, substantially and to a satisfactory degree, the counterbalance 14, here shown as being of a type similar to the one shown in a schematic manner in FIGS. 2 and 4. Therefore, the interposition of a lever 28 is proposed for applying the playing loads. In this case the arm, or rather the arms, 22' do not act directly on counterbalance 14, but do so by means of the lever whose arms have a certain ratio, for instance 1:4, to satisfy such a reduction. According to FIG. 5, the arms 12', which are in the sides of the bed, have their free extremities connected with one of the ends of the strings 29 whose other ends are tied in the arc 28a of the lever 28. This lever, assembled on the fulcrum 30, has the other extremity 30a connected with counterbalance 14 by means of the string 31 that is guided on the corresponding pulleys, just as in the case of the aforesaid string 29. In this practical embodiment at least one shock absorber brake is provided whose cylinder 33 has its base set on a pivot 33', whereas the staff 34 of the piston has its fulcrum with its external extremity in 34', with rotation pivot assembled in the corresponding side of the bed. The ease of the angular movement of the group cylinder piston makes the latter capable of intervening efficiently in whatever angular position of the bed is desired during the displacement phase from or to storage position. The shape of the lever 28, according to FIG. 5, makes the load of the bed act with constant leverage in respect to the rotation axis 30, whereas in the opposite extremity 30a the effect on traction of counterbalance 14 might eventually be affected by the angular position of the lever, even though operating around to an almost horizontal medium line. In any case, the angular position of the bed in the displacement phase has certain reflex action on the effort of the operator as a result of the variation in the momentum according to the principle previously expressed. Nevertheless, this will be in a degree much less relevant in regard to the pattern previously described.

Figure 6:
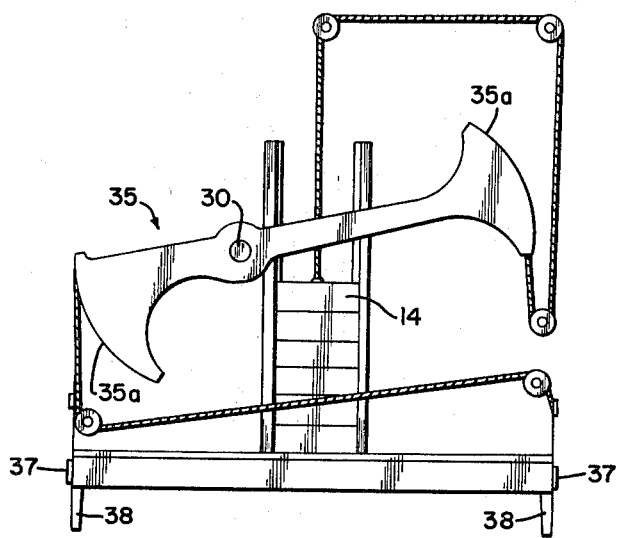
FIG. 6 shows a schematic representation of the disposition of levers and counterbalance according to another practical embodiment.

More than satisfactory results will be obtained by use of the practical embodiment shown in a schematic manner in FIG. 6. Along this line, the cam shape of the extremity area of the lever 35, with the fulcrum still in 30 and eventually with the same ratio 1:4 in the arms, can be considered an important and interesting variation. The arc 35a in this case, has an eccentric shape that takes into account the already mentioned sinusoidal variation of the momentum of the load of the bed in its angular displacement of about 90 degrees in order to reduce its influence to practically zero, or to the least extent possible. Whenever one wishes displacement to be constant, the action of the counterbalance in whatever angular position the bed might be in relation to the opposite extremity of the lever 35, might present a circle-shaped arc with its center in the fulcrum of arc 30. In any case, the corresponding string that is connected to the counterbalance 14 leans for its guide on the opposite arc of the lever 35, as already suggested.

In this practical embodiment and in the one shown in FIG. 5 as well, the automatic drive of the small legs form a support for the base of the bed on the floor. In FIG. 5, it can also be observed with greater clarity, that in the sides of the bed, there are assembled two couples of pulleys, one for each side. In each couple the pulley 36 is fixed, whereas the other one 37, to which is attached the small leg 38, is movable. Pulleys 36 and 37 are connected with one another by means of a string 39 which is conveniently tied to both pulleys. If one starts from the horizontal position represented in FIGS. 5 and 6, it will be easy to comprehend that in consequence of the fixed position of the pulley 36, according to the movement of the bed toward the vertical position of storage, it will cause the folding of the strip 39 on the outer edge of this pulley to correspond and bring about a consequent rotation of the other pulley 37 to effect traction of the strip with its fold on 36. The rotation of pulley 37, which substantially also brings about a corresponding unfolding of the strip from the pulley itself, and brings into rotation also the attached small leg 38, the bed proceeds to take its storage position. It is clear that reverse movement of the strip 39 and, therefore, of the pulley 37, with the attached small leg 38, will occur when the shifting of the bed is made from its almost vertical storage position to its horizontal position of use. In the pattern shown schematically in FIG. 7, the significant variation in relation to the embodiment of the invention represented by FIG. 6 pertains to counterbalance 14 and the relative gliding guides 15 that once again in FIGS. 1–4, had been shown parallel and vertically continuous.

Figure 7:
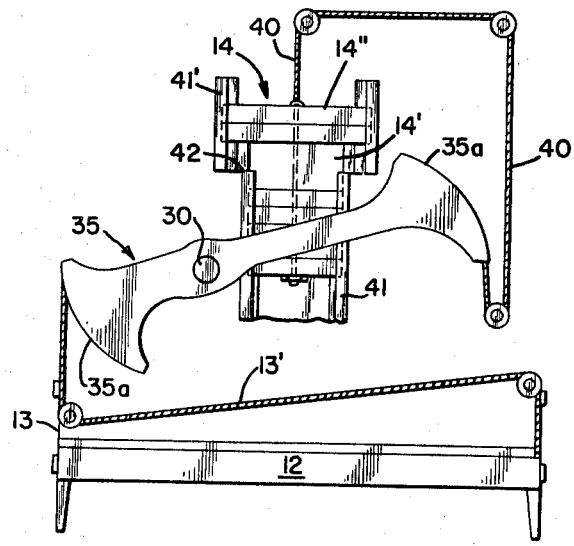
FIG. 7 shows a schematic representation of a further illustration, with disposition of a lever in relation to intermediate fulcrum and counterbalance, with variable arms of the lever constituting the extremity sectors which have a cam shape, and with different distributions of the loads which constitute the counterbalance.

In this new and practical embodiment there are two series of counterbalancing glider elements 14 and 14', lower and upper, respectively, along a central cable 40, of which one ring at the extremity 40' acts as a stopper for the elements themselves, particularly for the lower ones 14'. The guides of the series of counterbalances are still vertical and parallel but not continuous. These guides 41 and 41' lead from an intermediate and horizontal abutment 42 on which the upper loads of counterbalance 14'', having a length longer than the length of the lower loads, lean. The aforesaid capability of gliding of the series of counterbalances on the cable 40 makes it possible to separate the action of the loads so that in the initial phase of angular displacement of the bed from storage position to position of use, the terminal stopper ring 40' plays the role of parting loads of counterbalance 14', in the upward direction, since upper loads remain during this phase on abutment 42 until a certain angle of rotation is reached leading to contact between upper and lower loads. By continuing the angular movement, the upper loads, too, will be pushed upward and a greater counterbalance will be brought to bear as long as the final position represented in FIG. 7 is obtained by the total counterbalance of both series of loads 14' and 14''. In this case, the lever 35 with the sectors of extremity 35a, pulleys and small legs, 37 and 38, respectively, reflect the function described in FIGS. 5 and 6.

FIG. 8 represents a primary solution where the drive is located in the center of the bed headboard for an angular displacement of the lever in which it is used as a counterbalance with a constant load. In this practical embodiment, the lever 43 with its fulcrum in 44, has one extremity shaped as circled arc 45, which acts as a supporter of the string or cable 46 that is tied to it by one end, whereas the other extremity, shown in 48, is connected with the center of the bed headboard corresponding with a respective pulley 47''', the cable has found the guide in the center of the intermediate pulleys 47 and 47'. Such a connection, in the same manner as explained for the previous practical embodiment allows the bed to be turned around its rotation axis, which is parallel to the headboard, so that the bed can be shifted from its storage position inside the wooden wardrobe to the position of use, and vice versa; and, as a consequence of such rotation the lever 43 will take up the positions represented by the continuous and dotted lines in FIG. 8, with the counterbalance of constant value attached to the other extremity 50 of the lever 43.

In the pattern shown in FIG. 9, the drive lever is substantially a rectilinear lever 51 with its fulcrum located in one of its extremities 52 for an angular displacement from the position shown in the sketch to its vertical position. In this case, the drive for the rotation of the bed around the rotation axis corresponding with the headboard, is also brought in center with the headboard itself by means of one end 48 of a string or cable 46, whose other end is connected to lever 51 at the intermediate point 53, whereas the other free extremity of lever 51 is connected to one end of the string 58 whose other end 59 carries the loads having the functions of counterbalance. It can be quickly ascertained whether the arms of the forces applied to lever 51 in 53 and 55, respectively, have the correct ratio previously mentioned (for instance, 1:4). Pulleys 47, 47', 47'' as well as pulley 54, serve in this case to guide string 46 into the connection between the lever and the headboard, whereas those shown in 56 and 56' act as guides for string 58 in connection between the lever and the loads.

It goes without saying that in this case also a system of counterbalances can be applied, as shown in FIG. 7. Then the corresponding end of the string 58 will have a terminal upper ring 40' as shown in FIG. 7 for the support and possible gliding of the double series of loads shown by dotted lines, 14' and 14'', and with the aid of another guiding pulley 56'' for the string itself.

Technicians in this particular field can easily comprehend that other arrangements and changes may be utilized in one or more parts of the turnover wall-a-bed mechanism, without departing from the basic conception of this invention. Among other things the possibility can be visualized of applying an electromechanical drive, for instance, with the aid of a small electric motor for the purpose of actuating the movable parts.

What is claimed is:

1. A turnover wall-a-bed in connection with and parallel to a headboard panel assembled as a horizontal cross shaft, both external ends of said shaft being assembled on supports allowing the shaft and the bed secured to it an angular movement from upright rest position to a horizontal position, said bed being equipped with counterbalanced weights sliding along vertical guides and being connected with the bed, whereby a reduction of the bed-weight effect may be obtained during movement from upright to horizontal position; on one of the headboard panel sides being assembled a shock absorber brake to reduce the bed-weight effect at the final movement, both in a horizontal position and in an upright position.

2. A turnover wall-a-bed, as claimed in claim 1, characterized by the fact that the counterbalance weight may be combined with one or more elements joined by a string or chain and sliding on pulleys, said strings being connected at their other ends to a rotating shaft of the turnover bed by an arm fastened to the bed, so that the bed is maintained in its upright position by the above-mentioned counterbalance weight action.

3. A turnover wall-a-bed, as claimed in claim 1, characterized by the fact that a system of articulated arms is connected to the rotating shaft and to the bed supports, whereby to allow a shock absorber brake to act as a cushion mainly in the final movement of the bed both in the horizontal and in the upright positions.

4. A turnover wall-a-bed, as claimed in claim 1, characterized by the fact that the connection between the arms fastened at both sides of the headboard panel and the counterbalance weight may be obtained by an intermediate lever on a horizontal fulcrum and normal to the rotating axis of the bed, both ends of said lever being connected by string or cable with the free ends of the above-mentioned arms and with the counterbalance weight, the arms of the lever are so arranged to allow a reduction of the counterbalance weight, both ends of this lever being provided with an appropriate shape, whereby the relative momentum has a constant value during the rotation of the lever.

5. A turnover wall-a-bed, as in claim 4, characterized by the fact that the shape of the extreme arc of such lever, in connection with point of the strings joined with arms, which, in turn, are fastened at both sides of the headboard panel, is eccentric so that the moment the correspondent load applied to both ends of the lever follows as near as possible the zinc curve, which corresponds to its own bed-weight along its angular movement from and to the upright rest position.

6. A turn-over-wall bed characterized by the fact that in connection with its headboard, at adequate distance and in parallel with the same headboard, is carried a fixed mast oblique and horizontal, whose external lateral sides are properly fitted in supports to allow the mast, and the turnover wall-a-bed fixed to it, an angular movement thereby starting from the upright rest position and ending in a horizontal position for its use; and having a drive system for this angular movement of the bed made of a lever with intermediate fulcrum normally fixed to the rear wall of a piece of furniture, with two extremities shaped eccentrically for the assemblying and leaning of strings; and chains, connecting the same extremities with the sides of the bed headboard and with the loads of the counterbalance, respectively; the eccentric shape, in cooperation with suitable ratios of the arms of the lever, aims at reducing the difference of the momentum of the forces in action during the above-mentioned angular movement.

References Cited
UNITED STATES PATENTS

| | | | |
|---|---|---|---|
| 2,671,230 | 3/1954 | Pottor | 5—2 X |
| 3,224,015 | 12/1965 | Schneider | 5—2 |

CASMIR A. NUNBERG, Primary Examiner

U.S. Cl. X.R.

5—133